(12) United States Patent
Joo et al.

(10) Patent No.: US 9,048,749 B2
(45) Date of Patent: Jun. 2, 2015

(54) POWER SUPPLY, POWER CONTROL METHOD FOR CONTROLLING A STANDBY MODE, AND DISPLAY APPARATUS HAVING THE SAME

(71) Applicant: SAMSUNG ELECTRONICS CO., LTD., Suwon-si (KR)

(72) Inventors: Sung-yong Joo, Yongin-si (KR); Jin-hyung Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/244,063

(22) Filed: Apr. 3, 2014

(65) Prior Publication Data
US 2014/0368742 A1 Dec. 18, 2014

(30) Foreign Application Priority Data

Jun. 12, 2013 (KR) ........................ 10-2013-0067022

(51) Int. Cl.
| H04N 5/63 | (2006.01) |
| H02M 1/42 | (2007.01) |
| H02M 3/335 | (2006.01) |
| H02M 7/217 | (2006.01) |

(52) U.S. Cl.
CPC .......... *H02M 1/4208* (2013.01); *H02M 7/2176* (2013.01); *H02M 2001/4291* (2013.01); *H02M 3/33507* (2013.01); *H04N 5/63* (2013.01)

(58) Field of Classification Search
USPC .................. 348/730, 790; 345/211, 212, 102; 323/282, 283, 285, 266, 290; 363/21.01, 39, 44, 74, 21.12, 21.13; 315/200 R, 209 R, 217–219, 211, 224
See application file for complete search history.

(56) References Cited

U.S. PATENT DOCUMENTS

| 5,349,515 | A | 9/1994 | Megeid |
| 5,905,491 | A * | 5/1999 | Kim .............................. 345/212 |
| 6,469,917 | B1 | 10/2002 | Ben-Yaakov |
| 6,982,547 | B2 | 1/2006 | Haas |
| 8,115,457 | B2 * | 2/2012 | Balakrishnan et al. ........ 320/166 |
| 8,222,772 | B1 * | 7/2012 | Vinciarelli ..................... 307/140 |
| 8,395,366 | B2 | 3/2013 | Uno |
| 2003/0214609 | A1 | 11/2003 | Cha et al. |

(Continued)

OTHER PUBLICATIONS

Communication dated Mar. 25, 2015 issued by the European Patent Office in counterpart European Patent Application No. 14154606.9.

*Primary Examiner* — Victor Kostak
(74) *Attorney, Agent, or Firm* — Sughrue Mion, PLLC

(57) ABSTRACT

A power supply, a power control method and a display apparatus having the same, for controlling a standby mode, are provided. The power supply of an electronic apparatus includes: a rectifier configured to rectify a current of alternating current (AC) power input as input power, into a direct current (DC); a power factor correction (PFC) circuit configured to correct a power factor of a DC voltage converted by the rectifier; a switching circuit configured to convert the DC voltage output by the PFC circuit into a predetermined operating voltage and a standby voltage and supply the operating voltage and the standby voltage to the electronic apparatus; and an output controller configured to control the PFC circuit and the switching circuit to convert the DC voltage into the predetermined operating voltage and standby voltage by the switching circuit and supply the operating voltage and the standby voltage to the electronic apparatus.

14 Claims, 5 Drawing Sheets

(56) References Cited

U.S. PATENT DOCUMENTS

| | | | |
|---|---|---|---|
| 2005/0116694 A1* | 6/2005 | Hermann et al. | 323/247 |
| 2006/0267565 A1* | 11/2006 | Louvel et al. | 323/282 |
| 2006/0267575 A1* | 11/2006 | Sampson et al. | 324/110 |
| 2007/0124615 A1* | 5/2007 | Orr | 713/300 |
| 2008/0285313 A1* | 11/2008 | Oettinger et al. | 363/26 |
| 2009/0237057 A1* | 9/2009 | Dishman et al. | 323/285 |
| 2010/0052556 A1 | 3/2010 | Zudrell-Koch et al. | |
| 2010/0148699 A1* | 6/2010 | Krummel | 315/307 |
| 2011/0096063 A1* | 4/2011 | Kim | 345/212 |
| 2011/0096242 A1 | 4/2011 | Joo et al. | |
| 2011/0175590 A1* | 7/2011 | Yu et al. | 323/311 |
| 2012/0147631 A1* | 6/2012 | Nate | 363/21.15 |
| 2012/0223980 A1* | 9/2012 | Hollevoet et al. | 345/690 |
| 2012/0250357 A1* | 10/2012 | Yokoya et al. | 363/16 |
| 2012/0307535 A1 | 12/2012 | Kim et al. | |
| 2012/0319488 A1* | 12/2012 | Yu et al. | 307/66 |
| 2013/0054041 A1 | 2/2013 | Fishelov et al. | |

* cited by examiner

POWER SUPPLY, POWER CONTROL METHOD FOR CONTROLLING A STANDBY MODE, AND DISPLAY APPARATUS HAVING THE SAME

CROSS-REFERENCE TO RELATED APPLICATION

This application claims priority from Korean Patent Application No. 10-2013-0067022, filed on Jun. 12, 2013 in the Korean Intellectual Property Office, the disclosure of which is incorporated herein by reference, in its entirety.

BACKGROUND

1. Field

Apparatuses and methods consistent with the exemplary embodiments relate to a power supply, a power control method and a display apparatus having the same. More particularly, the exemplary embodiments relate to a power supply, a power control method and a display apparatus having the same which controls a standby mode through a switching circuit without an additional standby power supply, such as a flyback converter for controlling the standby mode.

2. Description of the Related Art

Generally, a display apparatus such as a television (TV) includes a power supply such as a switching mode power supply (SMPS) to supply operating power. The power supply receives AC power as commercial power and converts the AC power into an operating voltage at a level required for switching mode elements and supplies the converted voltage to the switching mode elements.

To correct a power factor and harmonic distortion, a power supply typically includes a power factor correction (PFC) circuit to correct the power factor when a current waveform becomes a pulse rather than a sine wave; and a switching circuit such as a DC-DC local link converter (LLC) to control the voltage output by the PFC circuit and supply a current at a consistent level to the switching mode elements.

In a power supply of the related art, the switching circuit converts the AC power only into the operating voltage at the level required, and thus the power supply further needs a standby power supply such as a flyback converter to supply a standby voltage in a standby mode. As a result, the power supply of the related art becomes larger and manufacturing costs increase.

SUMMARY

Accordingly, one or more exemplary embodiments provide a power supply, a power control method and a display apparatus having the same, which controls a standby mode through a switching circuit without an additional standby power supply such as a flyback converter for controlling the standby mode.

The foregoing and/or other aspects may be achieved by providing a power supply of an electronic apparatus, the power supply including: a rectifier configured to rectify a current of alternating current (AC) power input as input power, into a direct current (DC); a power factor correction (PFC) circuit configured to correct a power factor of a DC voltage converted by the rectifier; a switching circuit configured to convert the DC voltage output by the PFC circuit into a predetermined operating voltage and a standby voltage, and supplies the operating voltage and the standby voltage to the electronic apparatus; and an output controller configured to control the PFC circuit and the switching circuit to convert the DC voltage into the predetermined operating voltage and standby voltage by the switching circuit, and to supply the operating voltage and the standby voltage to the electronic apparatus.

The switching circuit may include a first converter configured to convert the DC voltage output by the PFC circuit into a level of the predetermined standby voltage and supplies the DC voltage to the electronic apparatus; a second converter configured to convert the DC voltage output by the PFC circuit into a level of the predetermined normal operating voltage and supplies the DC voltage to the electronic apparatus; and a switching part which is connected to an input terminal of the first and second converters and switches a current flow.

The output controller may be configured to control the switching module of the switching circuit by receiving at least one of the voltages converted by the first and second converters.

The output controller may be configured to control the DC voltage output by the PFC circuit into 320V to 385V in a standby mode.

The output controller may be configured to control the DC voltage output by the PFC circuit into 385V in a normal mode.

The first converter may include a primary coil, and a first secondary coil to which a predetermined voltage is applied by the primary coil, and the second converter comprises the primary coil, and a second secondary coil which is connected to the primary coil in parallel with the first secondary coil in order to share the primary coil.

The second secondary coil may include first and second wirings, and the second converter comprises first and second rectifying diodes which are symmetrically connected to the first and second wirings.

The output controller may include a single integrated circuit (IC) chip.

According to another aspect of the exemplary embodiments, a power control method for receiving AC power and supplying the AC power as operating power to an electronic apparatus includes: rectifying a current of the AC power input as input power and converting the current into a direct current (DC); and converting a level of a DC voltage converted from the input power into a predetermined level and concurrently converting the DC voltage that has been converted into the predetermined level, into a predetermined standby voltage and operating voltage and outputting the standby voltage and the operating voltage to the electronic apparatus.

The outputting may include: determining whether a current operation mode of the electronic apparatus is the standby mode; and converting the level of the DC voltage converted from the input power, into a first level within a predetermined range, and concurrently converting the DC voltage that has been converted into the first level, into the predetermined standby voltage and operating voltage in response to the current operation mode of the electronic apparatus being the standby mode.

The outputting may include: determining whether a current operation mode of the electronic apparatus is the normal mode; and converting the level of the DC voltage converted from the input power, into a second level, and concurrently converting the DC voltage that has been converted into the second level of the DC Voltage, into the predetermined standby voltage and the operating voltage.

According to further another aspect of the exemplary embodiments, a display apparatus includes: a signal receiver configured to receive an image signal; a signal processor configured to process the image signal received by the signal receiver; a display configured to display an image thereon based on the image signal processed by the signal processor; and a power supply which receives AC power as input power and supplies the received AC power as operating power.

The power supply may include a rectifier which rectifies a current of the AC power input as the input power and converts the current into a DC; a PFC circuit configured to correct a power factor of a DC voltage converted by the rectifier; a switching circuit configured to convert the DC Voltage output by the PFC circuit into a predetermined operating voltage and standby voltage and supplies the operating voltage and the standby voltage to the electronic apparatus; and an output controller configured to control the PFC circuit and the switching circuit to convert the DC voltage into the predetermined operating voltage and standby voltage by the switching circuit and to supply the operating voltage and the standby voltage to the electronic apparatus.

The switching circuit may include a first converter configured to convert the DC voltage output by the PFC circuit into a level of the predetermined standby voltage, and supplies the DC voltage to the electronic apparatus; a second converter configured to convert the DC voltage output by the PFC circuit into a level of the predetermined normal operating voltage and supplies the DC voltage to the electronic apparatus; and a switching mode connected to an input terminal of the first and second converters and controls a current flow.

The output controller may be configured to control the switching module of the switching circuit by receiving at least one of the voltages converted by the first and second converters.

The output controller may control the DC voltage output by the PFC controller into 320V to 385V, in a standby mode.

The output controller may be configured to control the DC voltage output by the PFC controller into 385V, in a normal mode.

The first converter may include a primary coil, and a first secondary coil to which a predetermined voltage is applied by the primary coil, and the second converter comprises the primary coil, and a second secondary coil which is connected to the primary coil in parallel with the first secondary coil to share the primary coil.

The second secondary coil may include first and second wirings, and the second converter comprises first and second rectifying diodes which are symmetrically connected to the first and second wirings.

An aspect of an exemplary embodiment may provide a power supply of an electronic apparatus, the power supply including: a switching circuit configured to convert a DC voltage into a predetermined operating voltage and a standby voltage and; and an output controller configured to control the switching circuit in order to supply the operating voltage and the standby voltage to the electronic apparatus.

The power supply may further include a rectifier configured to rectify an alternating current (AC) power input as input power, into a direct current (DC).

The power supply may further include a power factor correction (PFC) circuit configured to correct a power factor of a DC voltage converted by the rectifier.

The switching circuit may include a first converter configured to convert the DC voltage output by the PFC circuit into a level of the predetermined standby voltage; a second converter which converts the DC voltage output by the PFC circuit into a level of the predetermined normal operating voltage; and a switching module which is connected to an input terminal of the first and second converters and switches a current flow.

The first converter may include a primary coil and a first secondary coil to which a predetermined voltage is applied by the primary coil, and the second converter comprises the primary coil, and a second secondary coil which is connected to the primary coil in parallel with the first secondary coil in order to share the primary coil.

The output controller may include a single IC chip.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
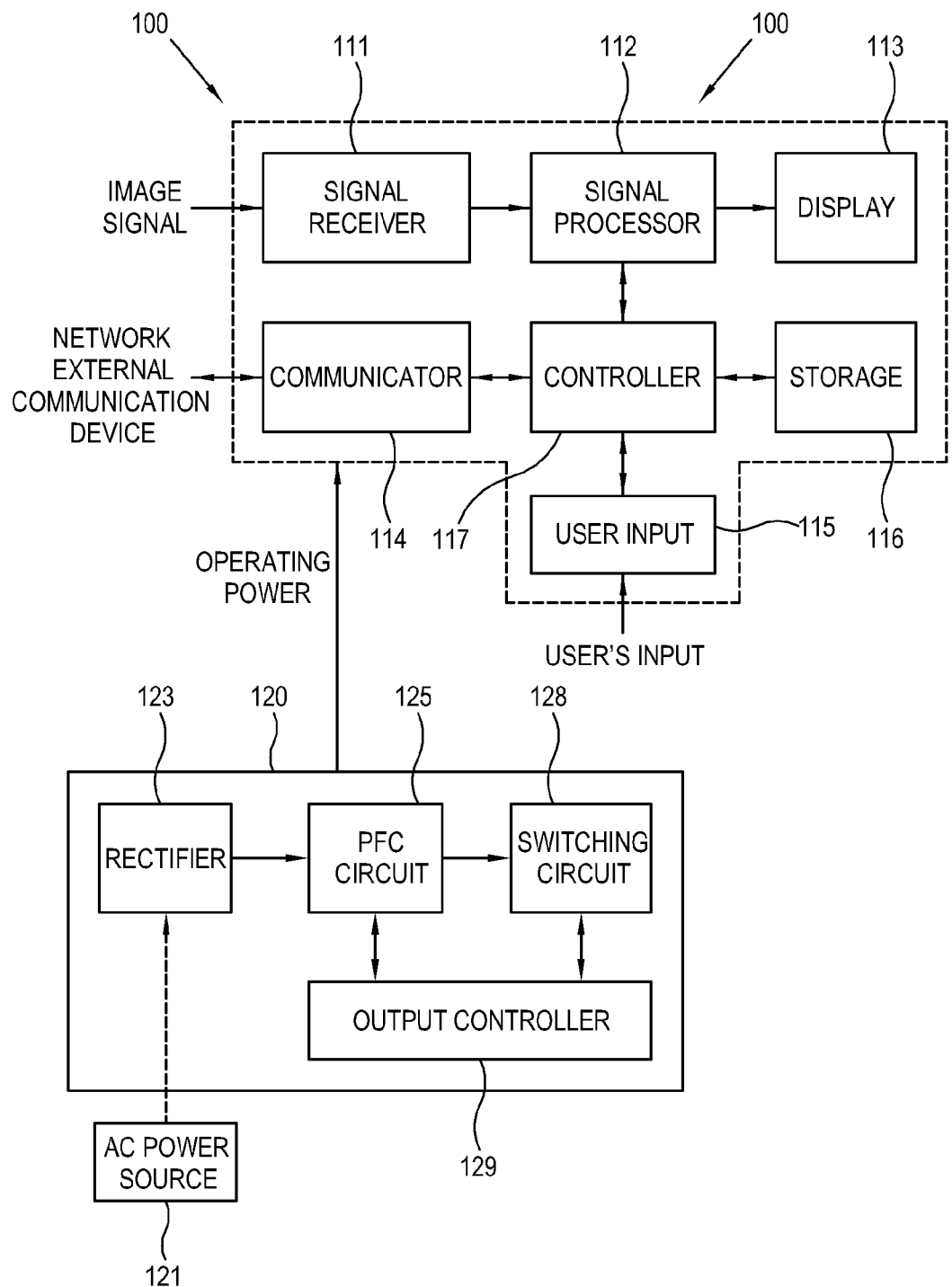
FIG. 1 is a block diagram of a display apparatus including a power supply according to an exemplary embodiment.

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Hereinafter, a power supply, a power control method and a display apparatus having the same, according to exemplary embodiments will be described in detail with reference to the drawings.

FIG. 1 is a block diagram of a display apparatus 100 including a power supply according to an exemplary embodiment.

The display apparatus 100 may be implemented as a TV, and receives and processes an image signal and displays an image based on the processed image signal.

As shown therein, the display apparatus 100 includes a signal receiver 111, a signal processor 112, a display 113, a communicator 114, a user input 115, a storage 116 and a controller 117.

The signal receiver 111 receives an image signal from outside of the display apparatus. The image signal received by the signal receiver 111 includes a broadcast signal such as a digital TV (DTV) signal, and a cable broadcast signal. In this case, the signal receiver 111 may tune and receive a broadcast signal of a channel selected by a user, according to a control by controller 117.

The image signal received by the signal receiver 111 may include signals output by imaging devices such as a digital versatile disc (DVD) and a Blue-ray Disc™ (BD). The signal receiver 111 may further receive an audio signal for outputting audio, and a data signal for outputting data information, even though not shown in FIG. 1. The image signal, audio signal and data signal, according to an exemplary embodiment, may be received together as a single signal.

The signal processor 112 processes an image signal received by the signal receiver 111 to display an image on the display 113 based on the processed image signal. The image processing operation of the signal processor 112 includes decoding, image enhancing and scaling operations. The signal processor 112 may process audio signals and data signals received by the signal receiver 111.

The display 113 displays an image thereon based on the image signal processed by the signal processor 112. The display 113 may include a liquid crystal display (LCD) to display an image thereon. In this case, the display 113 may include an LCD panel, a panel driver and a backlight' (not shown). The display 113 may display data information included in the data signal processed by the signal processor 112.

The display apparatus 100 may further include an audio output, such as a speaker, to output an audio signal based on an audio signal processed by the signal processor 112.

The communicator 114 communicates with a communication device (not shown) through a network, such as the Internet. Otherwise, the communicator 114 may communicate with the communication device through a local area network, such as Bluetooth®. The communicator 114 performs communication according to a control by controller 117, and may transmit information to, or receive information from, a counterpart communication device. The information which is transmitted by the counterpart communication device through the communicator 114 includes at least one of images, audios and data, and may be consistently processed with the concerned information and output to the display 113.

The user input 115 may be implemented as, e.g., a remote controller or a manipulation panel to receive a user's input. The user input 115 may include an input key to turn on or off the display apparatus 100. The user's input which is received by the user input 115 is transmitted to the controller 117.

The storage 116 may be implemented as a non-volatile memory, such as a flash memory, or a hard disc drive to store data and information related to the display apparatus 100.

The controller 117 controls overall elements of the display apparatus 100, and may include firmware as a control program, and a central processing unit (CPU) and random access memory (RAM) to execute the firmware.

The display apparatus 100 may further include a power supply 120 to supply operating power to the foregoing elements, such as the display 113. The power supply 120 receives alternating current (AC) power as commercial power, converts the AC power into power at a necessary level for operating the elements such as the display 113, and supplies the converted power to the elements. For convenience, FIG. 1 does not illustrate a detailed power supply route from the power supply 120 to the elements including the display 113 and the controller 117.

Figure 2:
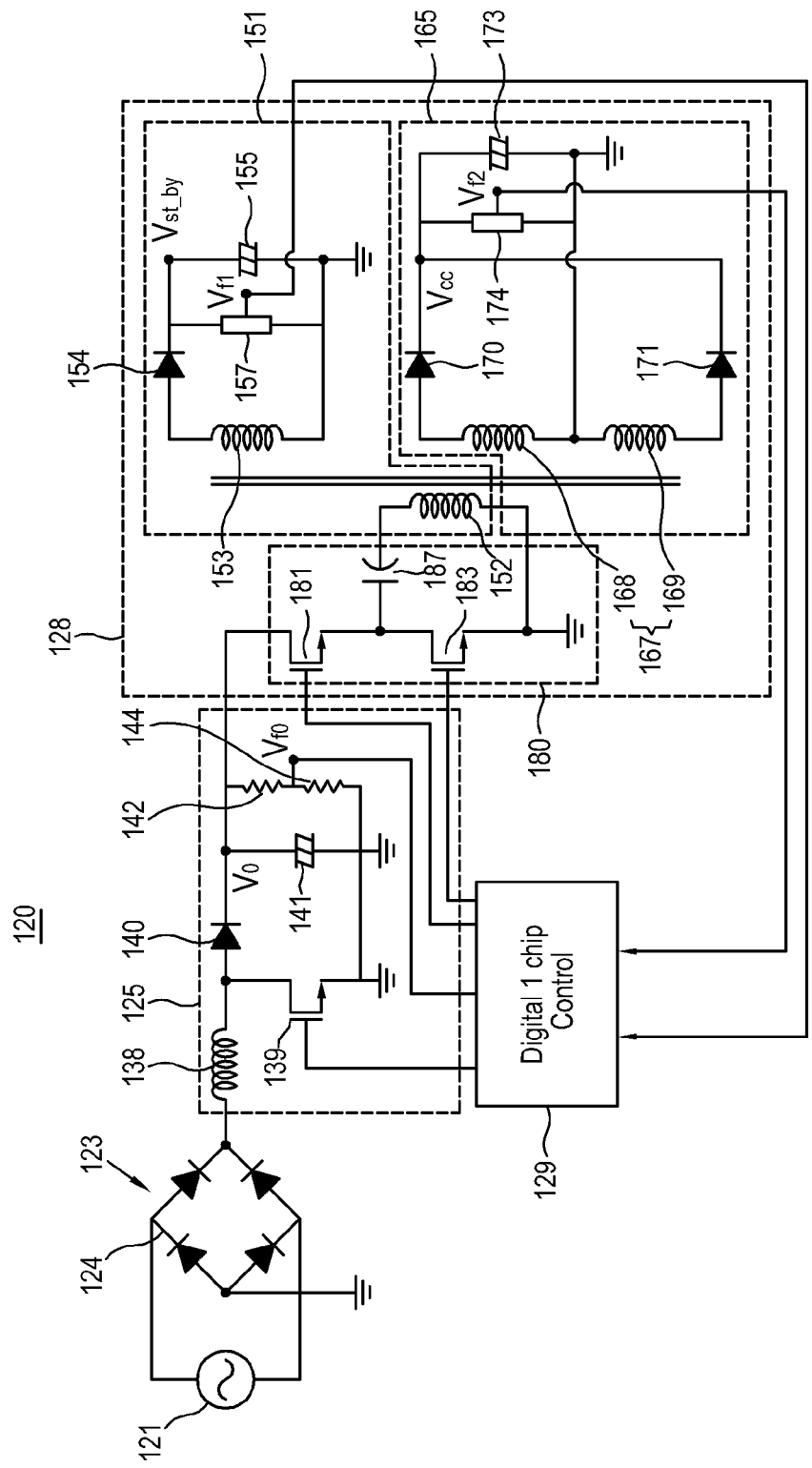
FIG. 2 is a circuit diagram showing the power supply in FIG. 1 according to an exemplary embodiment.

Referring to FIGS. 1 and 2, the power supply 120 according to an exemplary embodiment includes a rectifier 123, a power factor correction (PFC) circuit 125, a switching circuit 128 and an output controller 129.

The rectifier 123 rectifies a current of AC power output by an AC power source 121, and converts the AC power into DC power. The rectifier 123 may be implemented as, e.g., a bridge diode 124.

The PFC circuit 125 corrects a power factor of a DC voltage converted by the rectifier 123, and includes an inductor 138, a first rectifying diode 140, a first smoothing capacitor 141, first and second feedback resistors 142 and 144 and a first switching element 139. The first switching element 139 may be implemented as a field effect transistor (FET).

The inductor 138 charges voltages when the first switching element 139 is turned on, and outputs the charged voltages together with the DC voltage output by the rectifier 123, to the first rectifying diode 140 when the first switching element 139 is turned off, according to a control operation by the output controller 129.

The first smoothing capacitor 141 smoothes the DC voltage output by the inductor 138 through the first rectifying diode 140, when the first switching element 139 is turned off.

The output controller 129 switches the first switching element 139 in a predetermined frequency based on a voltage $V_{fo}$ provided by the first and second feedback resistors 142 and 144 so that the PFC circuit 125 outputs an output voltage $V_O$ at a predetermined target DC voltage level. The target DC voltage level ranges, e.g., between approximately 320V and 385V in a standby mode as in FIG. 3, and is approximately 385V in a normal mode as in FIG. 4.

As a result, the output voltage $V_O$ charged to the first smoothing capacitor 141 is boosted to approximately 320V to 385V in the normal mode and the standby mode, and the power factor of the power supply 120 is corrected accordingly. The boosted DC voltage is supplied as an input voltage to the switching circuit 128.

The switching circuit 128 is a DC-DC local link converter (LLC) which controls the output voltage $V_O$ output by the PFC circuit 125 and supplies a current at a consistent level to elements such as the display 113 and the controller 117, and includes first and second converters 151 and 165, and a switching module 180.

The first converter 151 converts the output voltage $V_O$ output by the PFC circuit 125 (i.e. a DC voltage of approximately 320V to 385V in the standby mode and of approximately 385V in the normal mode) into a level which corresponds to a standby voltage $V_{st\_by}$ of the display apparatus 100, e.g. into approximately 5V and supplies the voltage to elements such as a light emitting diode (LED) of the controller 117 which requires the standby voltage $V_{st\_by}$.

The first converter 151 includes a primary coil 152, and a first secondary coil 153 to which a predetermined voltage is applied by the primary coil 152. The primary coil 152 and the first secondary coil 153 have a coil turn ratio for converting the voltage input by the switching module 180 into a level which corresponds to the standby voltage $V_{st\_by}$, i.e. into approximately 5V.

The first converter 151 further includes a second rectifying diode 154 which rectifies a voltage applied to the first secondary coil 153; a second smoothing capacitor 155 which smoothes the voltage output by the second rectifying diode 154; and a first feedback circuit 157 which provides the output controller 129 with the voltage output by the second rectifying diode 154.

In the standby mode of the display apparatus 100 in which the operations of elements such as the display 113 are suspended and the LED of the controller 117 receives power, the voltage (i.e., approximately 5V) converted by the primary coil 152 and the first secondary coil 153 of the first converter 151 is smoothed by the second smoothing capacitor 155 and concurrently supplied in a continuous manner to the LED of the display 113. Even in the normal mode in which the display 113 and other elements operate, the LED of the controller 11 operates, and thus the voltage converted by the primary coil 152 and the first secondary coil 153 of the first converter 151 is continuously supplied to the LED of the controller 117.

The voltage converted by the first converter 151 is provided by the first feedback circuit 157 to the output controller 129.

The output controller 129 controls the switching module 180 and maintains the voltage output by the first converter 151 as approximately 5V which corresponds to the standby voltage $V_{st\_by}$, based on a feedback voltage $V_{f1}$ provided by the first feedback circuit 157. The first feedback 157 may be implemented as a known photo coupler or as a divider resistor.

The second converter 165 converts the output voltage $V_O$ output by the PFC circuit 125 (i.e. a DC voltage of approximately 320V to 385V in the standby mode and approximately 385V in the normal mode) into a level of an operating voltage $V_{CC}$ of the display apparatus 100, e.g., into approximately 24V and supplies the converted voltage to the display 113.

The second converter 165 includes the primary coil 152, and a second secondary coil 167 to which a predetermined voltage is applied by the primary coil 152. The primary coil 152 is shared between the first and second converters 151 and 165, and the second secondary coil 167 is connected to the primary coil 152 in parallel with the first secondary coil 153 to share the primary coil 152 with the first converter 151. The second secondary coil 167 includes a first wiring 168 and a second wiring 169.

The primary coil 151 and the first and second wirings 168 and 169 of the second secondary coil 167 have a coil turn ratio for converting the voltage $V_O$ input by the PFC circuit 125 into a level which corresponds to the operating voltage Vcc used to operate the display 113, i.e. into approximately 24V.

The second converter 165 further includes third and fourth rectifying diodes 170 and 171 which rectify a voltage applied to the first and second wirings 168 and 169 of the second secondary coil 167; a third smoothing capacitor 173 which smoothes the voltage output through the third and fourth rectifying diodes 170 and 171; and a second feedback 174 which provides the voltage output by the third and fourth rectifying diodes 170 and 171, to the output controller 129. The first wiring 168 and the third rectifying diode 170 are symmetrical to the second wiring 169 and the fourth rectifying diode 171. Like the first feedback 157, the second feedback 174 may be implemented as a known photo coupler or divider resistor.

In the normal mode, the elements requiring the operating voltage Vcc, e.g. the display 113, etc. are turned on, and thus the voltage (i.e. approximately 24V) converted by the primary coil 152 and the second secondary coil 167 of the second converter 165 is smoothed by the third smoothing capacitor 173, and continuously supplied concurrently in a manner to the display 113, etc. In the standby mode, the display 113, etc. are turned off. Thus, the voltage converted by the primary coil 152 and the second secondary coil 167 of the second converter 165 is charged one time to the third smoothing capacitor 173 and remains in the third smoothing capacitor 173 rather than being supplied to and used by the display 113, etc.

To correctly turn off the second converter 165 in the standby mode, a switch (not shown) may optionally be provided to be switched on by a power-off signal when a user turns off the display apparatus 100 through an input key of the user input 115. The switch may be installed in front of the third smoothing capacitor 173 of the second converter 165.

The voltage converted by the second converter 165 is provided by the second feedback 174 to the output controller 129, and the output controller 129 controls the switching part 180 and maintains the voltage output by the second converter 165 as approximately 24V, which corresponds to the operating voltage Vcc, based on a feedback voltage $V_{f2}$ provided by the second feedback 174.

The switching part 180 is connected to the primary coil 152 of the first and second converters 151 and 165 and controls a current flow.

The switching part 180 includes second and third switching elements 181 and 183, and a resonant capacitor 185. The second and third switching elements 181 and 183 are implemented as field effect transistors (FET), and connected in parallel to the output controller 129 and are alternately turned on and off by a control operation of the output controller 129. The resonant capacitor 185 is resonant with a leakage inductance value of the primary coil 153, and synchronizes a switching frequency with a resonant frequency necessary for receiving a voltage for operating the display 113.

Accordingly, the voltage $V_O$ input by the PFC circuit 125 (i.e. a DC voltage of approximately 320 to 385V in the standby mode and approximately 385V in the normal mode) is converted into, and output as, approximately 5V which corresponds to the standby voltage $V_{st\_by}$ through the first converter 151, and is converted into, and output as, approximately 24V which corresponds to the operating voltage Vcc through the second converter 165 as the first and second switching elements 181 and 183 are alternately turned on and off by a control of the output controller 129.

More specifically, in response to the second switching element 181 being turned on and the third switching element 183 is turned off, the current flows from the second switching element 181 to the primary coil 152, and a predetermined voltage is applied at the turn ratio by the primary coil 152 to the first secondary coil 153 of the first converter 151. The voltage applied to the first secondary coil 153 is rectified by the second rectifying diode 154 and then smoothed by the second smoothing capacitor 155.

Another predetermined voltage is applied at the turn ratio by the primary coil 152 to the first wiring 168 of the second secondary coil 167 of the second converter 165. The voltage applied to the first wiring 168 is rectified by the third rectifying diode 170 and then smoothed by the third smoothing capacitor 173.

A current flow to the second wiring 169 of the second secondary coil 167 is cut off by the fourth rectifying diode 171, and thus no voltage is applied to the second wiring 169 of the second secondary coil 167.

In response to the third switching element 183 being turned on and the second switching element 181 is turned off, a current flows from the third switching element 183 to the primary coil 152, and a predetermined voltage is applied at the turn ratio by the primary coil 152 to the second wiring 169 of the second secondary coil 167 of the second converter 165. The voltage applied to the second wiring 169 is rectified by the fourth rectifying diode 171 and then smoothed by the third smoothing capacitor 173.

A current flow to the first secondary coil 153 and the first wiring 168 of the second secondary coil 167 is cut off by the second and third rectifying diodes 154 and 170, respectively, and thus, no voltage is applied to the first secondary coil 153 and the first wiring 168 of the second secondary coil 167.

As the second and third switching elements 181 and 183 are alternately turned on and off, output terminals of the first and second converters 151 and 165 output, e.g. approximately 5V which corresponds to the standby voltage $V_{st\_by}$, and approximately 24V which corresponds to the operating voltage Vcc.

The output controller 129 is implemented as a single integrated circuit (IC) chip, such as a microprocessor. The output controller 129 controls the PFC circuit 125 and the switching circuit 128 to convert the voltage $V_O$ input by the PFC circuit 125 into the operating voltage Vcc and the standby voltage $V_{st\_by}$ by the switching circuit 128 and to supply the operating voltage Vcc and the standby voltage $V_{st\_by}$ to the elements such as the display 113, which require the operating voltage Vcc and to the elements, such as the LED of the controller 117 which requires the standby voltage $V_{st\_by}$.

Figure 3:
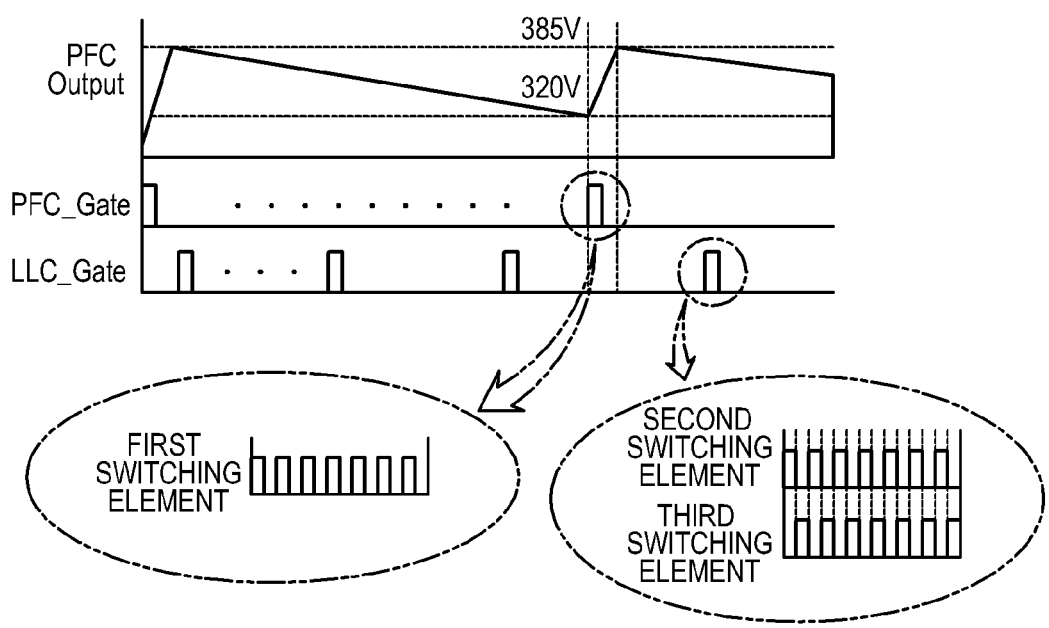
FIG. 3 is a waveform diagram showing an output voltage of a PFC circuit and a control signal waveform for controlling the PFC circuit and a switching circuit of the power supply in FIG. 2 in a standby mode according to an exemplary embodiment.

More specifically, as shown in FIG. 3, the output controller 129 periodically outputs an on/off control signal to a gate of the first switching element 139 in order to switch the first switching element 139 based on the voltage $V_{f0}$ provided by the first and second feedback resistors 142 and 144 so that the PFC circuit 125 outputs the output voltage $V_O$ at a predetermined target DC voltage level when in the standby mode.

Further, the output controller 129 periodically outputs an on/off control signal to a gate of the second and third switching elements 181 and 183 of the switching module 180 in order to switch the second and third switching elements 181 and 183 based on feedback voltages $V_{f1}$ and $V_{f2}$ provided by the first and second feedbacks 157 and 174 so that the first and second converters 151 and 165 output approximately 5V and 24V, respectively, as the standby voltage $V_{st\_by}$ and the operating voltage Vcc, at a predetermined target DC voltage level.

Figure 4:
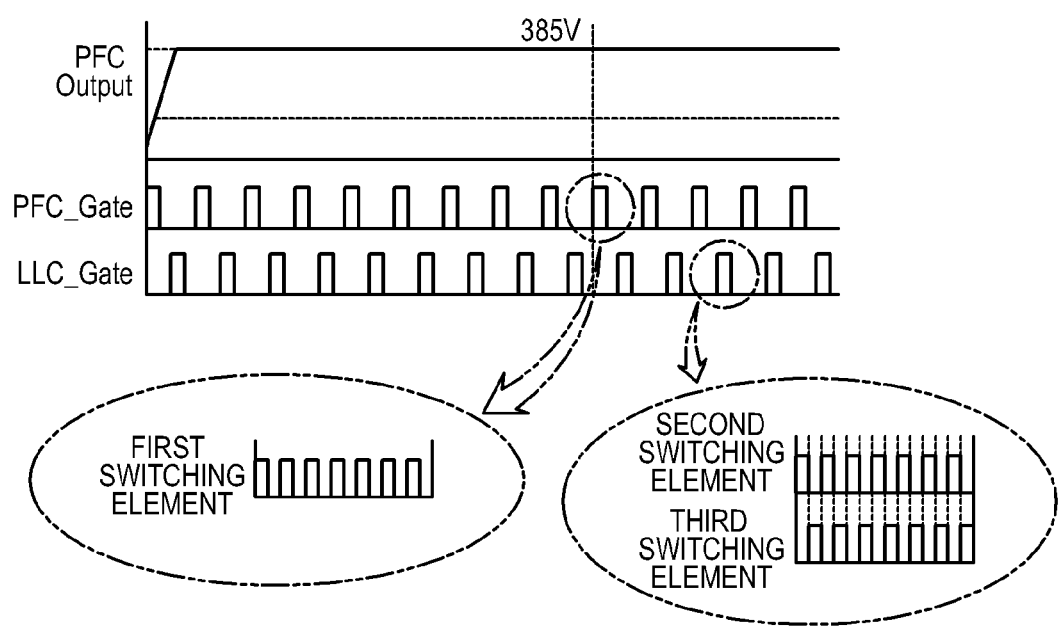
FIG. 4 is a waveform diagram showing an output voltage of the PFC circuit and a control signal waveform for controlling the PFC circuit and the switching circuit of the power supply in FIG. 2 in a normal mode according to the embodiment.

As shown in FIG. 4, in the normal mode, the output controller 129 consecutively outputs an on/off control signal to a gate of the first switching element 139 in order to switch the first switching element 139 based on the voltage $V_{f0}$ provided by the first and second feedback resistors 142 and 144, so that the PFC circuit 125 outputs the output voltage $V_O$ at a predetermined target DC voltage level, i.e., 385V.

The output controller 129 consecutively outputs an on/off control signal to a gate of the second and third switching elements 181 and 183 of the switching module 180 in order to switch the second and third switching elements 181 and 183 based on the feedback voltages $V_{f1}$ and $V_{f2}$ provided by the first and second feedbacks 157 and 174 so that the first and second converters 151 and 165 respectively output approximately 5V and 24V as the standby voltage $V_{st\_by}$ and normal operating voltage Vcc at the predetermined target DC voltage level.

The switching period of the first switching element 139 and the switching period of the second and third switching elements 181 and 183 may be set to prevent noise from an audible frequency band.

As described above, in the power supply 120 according to an exemplary embodiment, the switching circuit 125 includes both the first converter 151 to supply the standby voltage $V_{st\_by}$ and the second converter 165 to supply the normal operating voltage Vcc. Thus, the power supply 120, according to an exemplary embodiment may supply the standby voltage $V_{st\_by}$ through the switching circuit 125 in the standby mode without a need to include an additional standby power supply, such as a flyback converter, unlike a power supply of the related art.

The output controller 129 is implemented as a single IC chip for controlling the PFC circuit 124 and the switching circuit 128, and thus does not need an additional control circuit to control a standby power supply, such as a flyback converter, unlike a power supply of the related art.

This enables the power supply 120, according to an exemplary embodiment to use less parts and downsizes the display apparatus 100, and reduces manufacturing costs.

In the foregoing paragraphs, it has been exemplified and explained that the output voltage $V_O$ of the PFC circuit 125 respectively, ranges between 320V and 385V and 385V in the standby mode and normal mode, as controlled by the output controller 129, and the standby voltage $V_{st\_by}$ and the operating voltage Vcc of the first and second converters 151 and 165 are 5V and 24V, respectively, in the standby mode, and normal mode, as controlled by the output controller 129, but are not limited thereto. Alternatively, the output voltage $V_O$ of the PFC circuit 125 may be set as other values, taking into account a capacitance of an electrolytic capacitor and ripple voltage of the display apparatus 100, in the standby mode and the normal mode, and the standby voltage $V_{st\_by}$ and the operating voltage Vcc may be set as other values (e.g. 3V and 12V) according to loading conditions and PFC ripple voltage in the standby mode.

In the foregoing paragraphs, the output controller 129 of the power supply 120 according to an exemplary embodiment has been exemplified and explained to control the standby voltage $V_{st\_by}$ and the operating voltage Vcc output by the first and second converters 151 and 165 based on the feedback voltages $V_{f1}$ and $V_{f2}$ provided by the first and second feedbacks 157 and 174 by using the first and second feedbacks 157 and 174 of the first and second converters, but is not limited thereto. Alternatively, the standby voltage $V_{st\_by}$ and the operating voltage Vcc of the first and second converters 151 and 165 may be controlled on the basis of one of the feedback voltages $V_{f1}$ and $V_{f2}$ provided by the first and second feedbacks 157 and 174, because the primary coil 152 and the first and second secondary coils 153 and 167 of the first and second converters 151 and 165 have the turn ratio for respectively outputting the standby voltage $V_{st\_by}$ and the operating voltage Vcc.

Hereinafter, a method of controlling the power of the power supply 120, which receives AC power and supplies operating power to an electronic apparatus such as the display apparatus 100, will be described.

Figure 5:
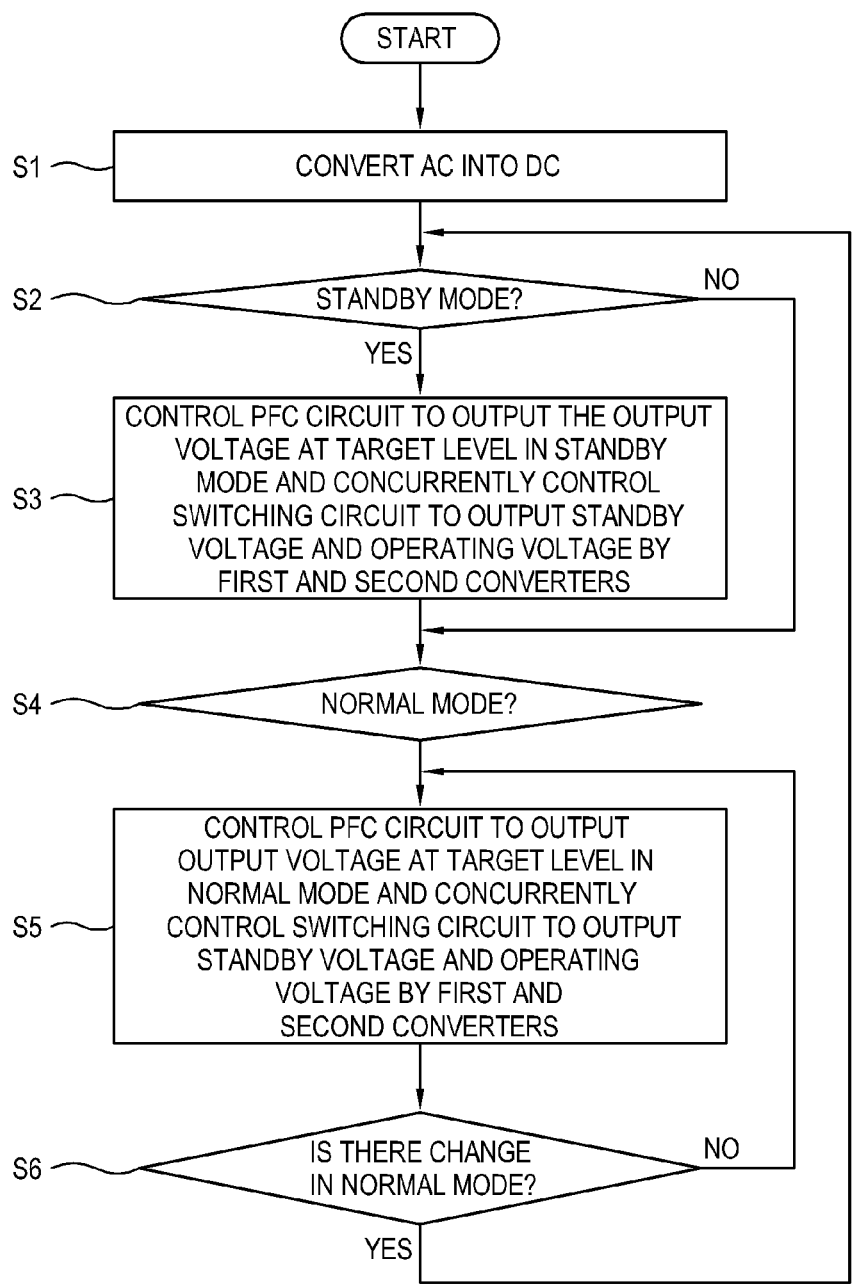
FIG. 5 is a flowchart showing a method of controlling power of the power supply, according to an exemplary embodiment.

Referring to FIG. 5, the rectifier 123 rectifies the current of the input power input by the AC power source 121 and converts the current into a direct current (S1).

The output controller 129 determines whether the current operation mode is the standby mode, according to the on/off signal output by the controller 117 which corresponds to the turn-on/off of the display apparatus 100 (S2).

In response to a determination that the display apparatus 100 is turned off, and thus the current operation mode is the standby mode, the output controller 129 controls the PFC circuit 125 to output the output voltage $V_O$ (e.g. 320V to 385V) at the predetermined target DC voltage level in the standby mode, and concurrently controls the switching circuit 128 to output the standby voltage $V_{st\_by}$ (e.g. approximately 5V) and the operating voltage Vcc (e.g. approximately 24V) at the predetermined target DC voltage level (S3), as described above with reference to FIG. 3. The standby voltage $V_{st\_by}$ output by the first converter 151 is supplied to, and used by, the LED of the controller 117 which operates in the standby mode while the operating voltage Vcc output by the second converter 165 is not supplied to the display 113, but rather remains in the third smoothing capacitor 173, since the display apparatus 100 is turned off.

The output controller 129 determines whether the current operation mode is the normal mode according to the on/off signal output by the controller 117 which corresponds to the turn-on/off of the display apparatus 100 (S4).

In response to a determination that the display apparatus 100 is turned on and thus the current operation mode is the normal mode, the output controller 129 controls the PFC circuit 125 to output the output voltage $V_O$ (e.g. approximately 385V) at the predetermined target DC voltage level in the normal mode, and concurrently controls the switching circuit 128 to output the standby voltage $V_{st\_by}$ (e.g. approximately 5V) and the operating voltage Vcc (e.g. approximately 24V) at the predetermined target DC voltage level (S5), as described above with reference to FIG. 4. The standby voltage $V_{st\_by}$ and the operating voltage Vcc output by the first and second converters 151 and 165 are supplied to, and are respectively used by the LED of the controller 117 and the display 113.

The output controller 129 determines whether there is any change in the current operation mode, according to the on/off signal output by the controller 117, which corresponds to the turn-on/off of the display apparatus 100 (S6). In response to there being any change in the current operation mode, the operations following the operation S2 are repeated.

As described above, the power supply 120, the power control method thereof and the display apparatus 100 having the same, according to an exemplary embodiment controls the standby mode through the switching circuit without an additional standby power supply, such as a flyback converter, in order to control the standby mode. Accordingly, the power supply 120, the power control method thereof and the display apparatus 100 having the same, according to an exemplary embodiment may use less components, may be downsized and have reduced manufacturing costs.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A power supply of an electronic apparatus, the power supply comprising:
   a rectifier configured to rectify an alternating current (AC) power input as input power, into a direct current (DC);
   a power factor correction (PFC) circuit configured to correct a power factor of a DC voltage converted by the rectifier;
   a switching circuit configured to convert the DC voltage output by the PFC circuit into a predetermined operating voltage and standby voltage and supply the operating voltage and the standby voltage to the electronic apparatus; and
   an output controller configured to control the PFC circuit and the switching circuit in order to convert the DC voltage into the predetermined operating voltage and standby voltage by the switching circuit and to supply the operating voltage and the standby voltage to the electronic apparatus,
   wherein the switching circuit comprises a first converter configured to convert the DC voltage output by the PFC circuit into a level of the predetermined standby voltage and supplies the DC voltage to the electronic apparatus, a second converter which converts the DC voltage output by the PFC circuit into a level of the predetermined normal operating voltage and supplies the DC voltage to the electronic apparatus, and a switching module which is connected to an input terminal of the first and second converters and switches a current flow,
   wherein the first converter comprises a primary coil, and a first secondary coil to which a predetermined voltage is applied by the primary coil, and
   wherein the second converter comprises the primary coil, and a second secondary coil which is connected to the primary coil in parallel with the first secondary coil in order to share the primary coil.

2. The power supply according to claim 1, wherein the output controller is configured to control the switching module of the switching circuit by receiving at least one of the voltages converted by the first and second converters.

3. The power supply according to claim 1, wherein the output controller is configured to control the DC voltage output by the PFC circuit into 320V to 385V, in a standby mode.

4. The power supply according to claim 1, wherein the output controller controls the DC voltage output by the PFC circuit into 385V in a normal mode.

5. The power supply according to claim 1, wherein the second secondary coil comprises first and second wirings, and the second converter comprises first and second rectifying diodes which are symmetrically connected to the first and second wirings.

6. The power supply according to claim 1, wherein the output controller comprises a single integrated circuit (IC) chip.

7. A display apparatus comprising:
   a signal receiver configured to receive an image signal;
   a signal processor configured to process the image signal received by the signal receiver;
   a display configured to display an image thereon based on the image signal processed by the signal processor; and
   a power supply configured to receive AC power as input power and supply the AC power to the display as operating power,
   wherein the power supply comprises:
      a rectifier configured to rectify a current of the AC power input as the input power and convert the rectified current into a DC voltage;
      a PFC circuit configured to correct a power factor of a DC voltage converted by the rectifier;
      a switching circuit, which comprises a first converter and a second converter, configured to convert the DC voltage output by the PFC circuit into a predetermined operating voltage and standby voltage and supply the operating voltage and the standby voltage to the electronic apparatus; and
      an output controller which controls the PFC circuit and the switching circuit to convert the DC voltage into the predetermined operating voltage and standby voltage by the switching circuit and to supply the operating voltage and the standby voltage to the display apparatus,
   wherein the first converter comprises a primary coil, and a first secondary coil to which a predetermined voltage is applied by the primary coil, and
   wherein the second converter comprises the primary coil, and a second secondary coil which is connected to the primary coil in parallel with the first secondary coil in order to share the primary coil.

8. The display apparatus according to claim 7, wherein the switching circuit comprises a first converter configured to convert the DC voltage output by the PFC circuit into a level of the predetermined standby voltage and supplies the converted DC voltage to the electronic apparatus;
   a second converter which converts the DC voltage output by the PFC circuit into a level of the predetermined normal operating voltage and supplies the converted DC voltage to the electronic apparatus; and
   a switching module configured to be connected to an input terminal of the first and second converters and control a current flow.

9. The display apparatus according to claim 7, wherein the output controller is configured to control the switching module of the switching circuit by receiving at least one of the voltages converted by the first and second converters.

10. The display apparatus according to claim 7, wherein the output controller is configured to control the DC voltage output by the PFC controller into 320V to 385V, in a standby mode.

11. The display apparatus according to claim 7, wherein the output controller is configured to control the DC voltage output by the PFC controller into 385V, in a normal mode.

12. The display apparatus according to claim 7, wherein the second secondary coil comprises first and second wirings, and
the second converter comprises first and second rectifying diodes which are symmetrically connected to the first and second wirings.

13. The display apparatus according to claim 7, wherein the output controller comprises a single IC chip.

14. A power supply of an electronic apparatus, the power supply comprising:
a switching circuit configured to convert a DC voltage into a predetermined operating voltage and a standby voltage;
an output controller configured to control the switching circuit in order to supply the operating voltage and the standby voltage to the electronic apparatus;
a rectifier configured to rectify an alternating current (AC) power input as input power, into a direct current (DC);
a power factor correction (PFC) circuit configured to correct a power factor of a DC voltage converted by the rectifier,
wherein the switching circuit comprises a first converter configured to convert the DC voltage output by the PFC circuit into a level of the predetermined standby voltage, a second converter which converts the DC voltage output by the PFC circuit into a level of the predetermined normal operating voltage, and a switching module which is connected to an input terminal of the first and second converters and switches a current flow,
wherein the first converter comprises a primary coil and a first secondary coil to which a predetermined voltage is applied by the primary coil, and
wherein the second converter comprises the primary coil, and a second secondary coil which is connected to the primary coil in parallel with the first secondary coil in order to share the primary coil.

* * * * *